United States Patent [19]
Manico et al.

[11] Patent Number: 5,764,870
[45] Date of Patent: Jun. 9, 1998

[54] METHOD OF MAKING AN INDEX PRINT

[75] Inventors: Joseph Anthony Manico, Rochester; David Lynn Patton, Webster; Thomas Richard Roule, Honeoye Falls; John Randall Fredlund, Rochester; Anthony Ronald Berardi, Rush, all of N.Y.

[73] Assignee: Eastman Kodak Company, Rochester, N.Y.

[21] Appl. No.: 203,149

[22] Filed: Feb. 28, 1994

[51] Int. Cl.$^6$ .................. G06K 15/12; G06T 3/00; H04N 1/387

[52] U.S. Cl. ............... 395/117; 382/282; 382/287; 358/453; 358/487; 358/488; 358/302; 347/226

[58] Field of Search .................. 358/487, 506, 358/474, 453, 488, 494, 527, 505, 538, 302; 206/455; 347/226; 395/117; 382/282, 287, 294

[56] References Cited

U.S. PATENT DOCUMENTS

| | | | |
|---|---|---|---|
| 4,688,104 | 8/1987 | Wolcott | 358/332 |
| 4,728,996 | 3/1988 | Matsumoto | 355/77 |
| 4,805,039 | 2/1989 | Otake et al. | |
| 4,823,163 | 4/1989 | Rollet et al. | 355/41 |
| 4,903,068 | 2/1990 | Shiota | 355/20 |
| 4,914,471 | 4/1990 | Saeki et al. | 355/40 |
| 4,918,484 | 4/1990 | Ujiie et al. | 355/41 |
| 4,931,832 | 6/1990 | Takenaka | 355/77 |
| 4,933,773 | 6/1990 | Shiota et al. | 358/302 |
| 4,937,617 | 6/1990 | Kito | 355/41 |
| 4,966,285 | 10/1990 | Otake et al. | 206/455 |
| 5,031,773 | 7/1991 | Manico et al. | 206/455 |
| 5,077,610 | 12/1991 | Searby et al. | |
| 5,113,268 | 5/1992 | Yoshida et al. | 358/487 |
| 5,119,126 | 6/1992 | Tokuda | 355/41 |
| 5,122,645 | 6/1992 | Saeki et al. | 235/462 |
| 5,128,519 | 7/1992 | Tokuda | 235/375 |
| 5,157,437 | 10/1992 | Takenaka | 355/41 |
| 5,164,574 | 11/1992 | Ujiie et al. | 235/462 |
| 5,184,227 | 2/1993 | Foley | 358/302 |
| 5,260,804 | 11/1993 | Fukutomi et al. | 358/453 |
| 5,337,164 | 8/1994 | Yabe et al. | 358/487 |

FOREIGN PATENT DOCUMENTS 1 694 570  3/1955  Germany.

OTHER PUBLICATIONS

Vol. 3, Che–Contact, Encyclopedia of Practical Photography Negative Filing, John Morris, pp. 72–75.

*Primary Examiner*—Scott Rogers
*Attorney, Agent, or Firm*—Frank Pincelli; David A. Novais

[57] ABSTRACT

A holder and a method of making an index print using the holder. The method comprising the steps of:

1) providing a holder having at least one sleeve for holding a film, said film having at least one developed image therein;
2) scanning the holder so as to obtain a digital record representative of the images present on said negative film; and
3) printing the digital record so as to form an index print wherein said at least one image is placed in a predetermined pattern.

22 Claims, 11 Drawing Sheets

5,764,870

1

METHOD OF MAKING AN INDEX PRINT

FIELD OF THE INVENTION

The present invention relates to a method of printing index prints from negative filmstrips.

BACKGROUND OF THE INVENTION

An index print generally comprises a plurality of reduced size images which correspond to the frames of a roll of negative film. These index prints are used for quickly identifying what is present on a roll of negative film. These index prints are typically made by an optical system which exposes a single frame of the negative at a time onto the index print This requires a significant amount of time and hardware in order to accomplish this.

It has also been suggested in the prior art to use a CRT printer for producing index prints. U.S. Pat. No. 4,903,068 discloses a CRT printer wherein all of the frames that are exposed on the negative are stored in video signals in memory so that electrical composites can be created so as to form an index print at a single exposure. This, of course, requires sophisticated hardware and algorithms in order to properly operate the system.

Another problem associated with prior art index prints is that typically the negative film is returned to the user in a packet wherein the negatives are placed in random order. Thus, the user must individually look at each of the strips until the appropriate negative is found of the image located on the index print.

The present invention provides a method for making an index print which is quick and relatively low cost and which does not require extensive hardware or software modifications. Additionally, the index print can be quickly associated with the negative film having the image thereon.

The present invention also comprises the advantage of generating index prints from an assortment of different strips of negatives or positives that originated from different rolls of film, thus allowing the consumer and operator to construct an index print according to their needs.

SUMMARY OF THE INVENTION

In one aspect of the present invention there is provided a method of printing an index print comprising the steps of:

1) providing a holder having at least one sleeve for holding a film, said film having at least one developed image therein;
2) scanning the holder so as to obtain a digital record representative of the images present on said film; and
3) printing the digital record so as to form an index print wherein said at least one image is placed in a predetermined pattern.

In accordance with another aspect of the present invention there is provided a holder for holding a plurality of films, the holder having a plurality of sleeves, each sleeve capable of holding at least one film. The holder is made of a material so as to allow digital scanning of the film while in the holder.

2

Figure 3:
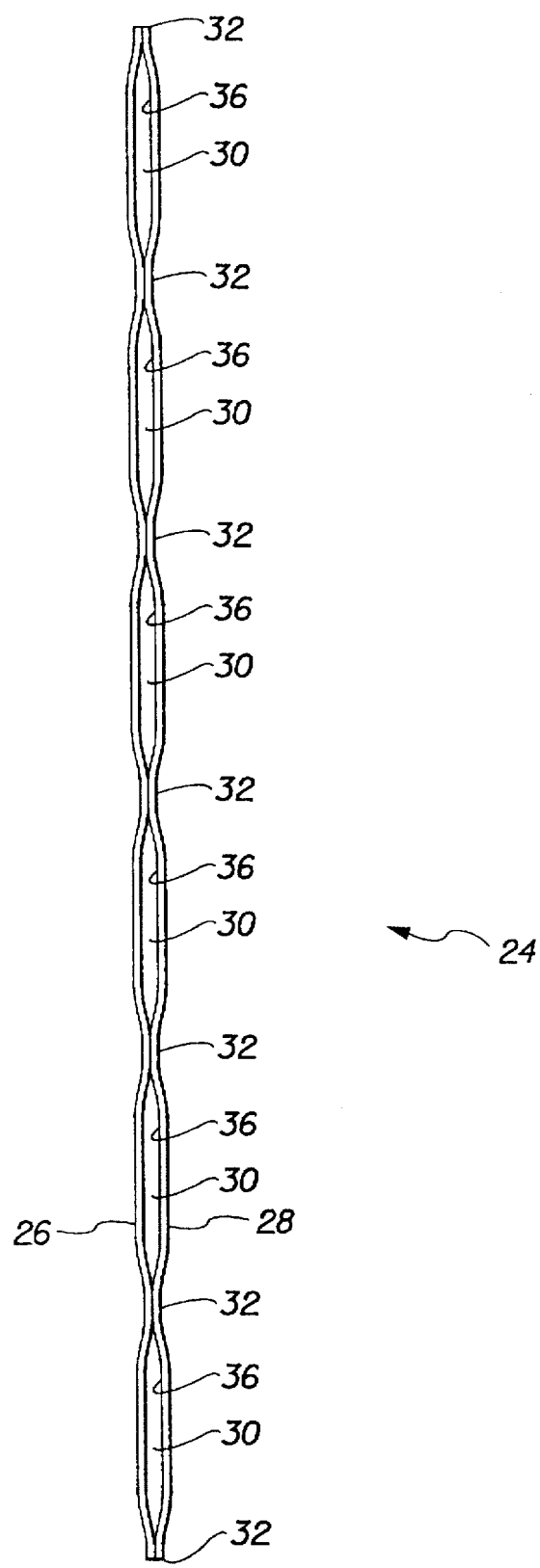
FIG. 3 is a side view of the holder of FIG. 2 with out any filmstrips disposed therein.
Figure 4:
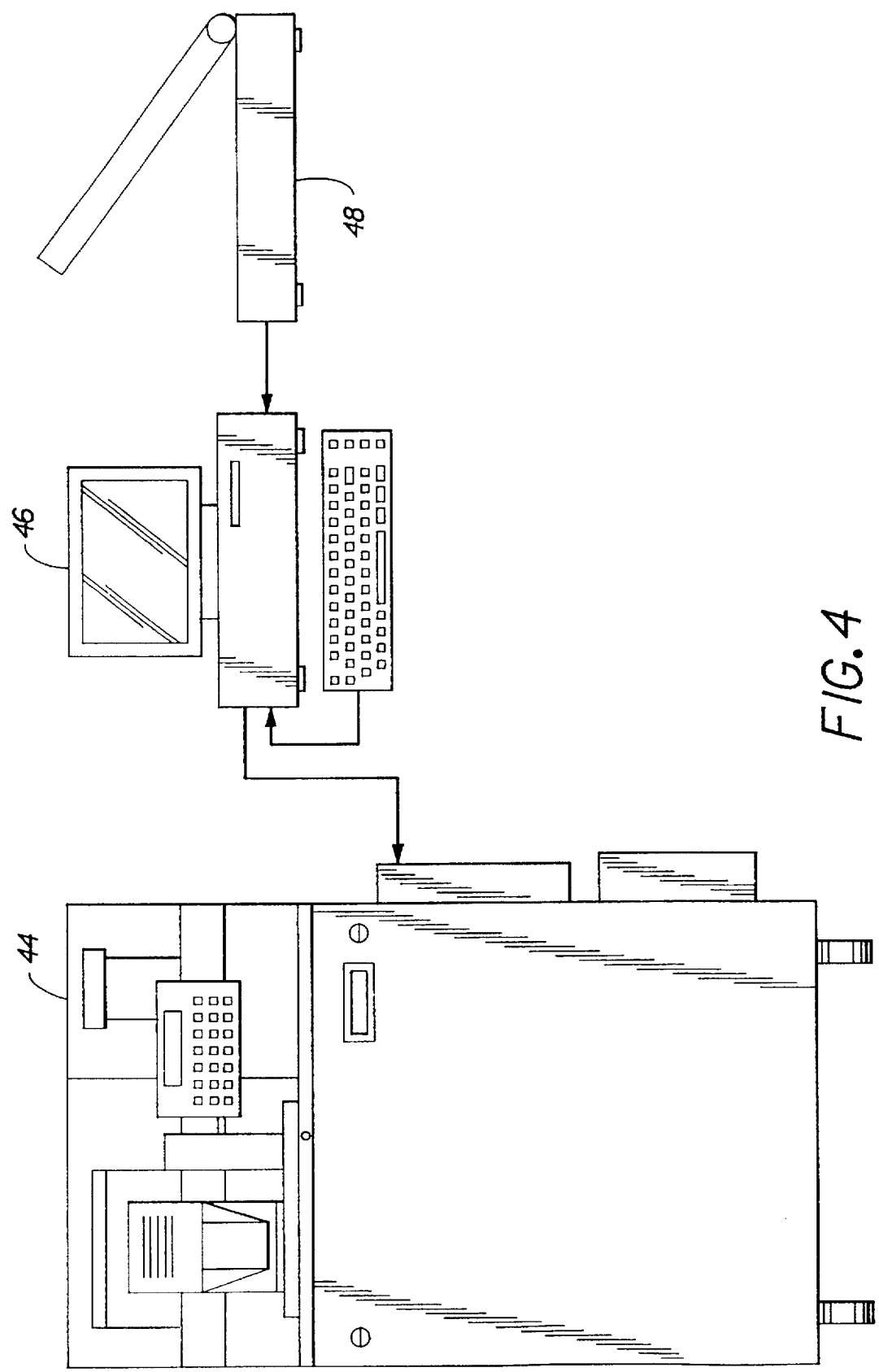
Figure 5:
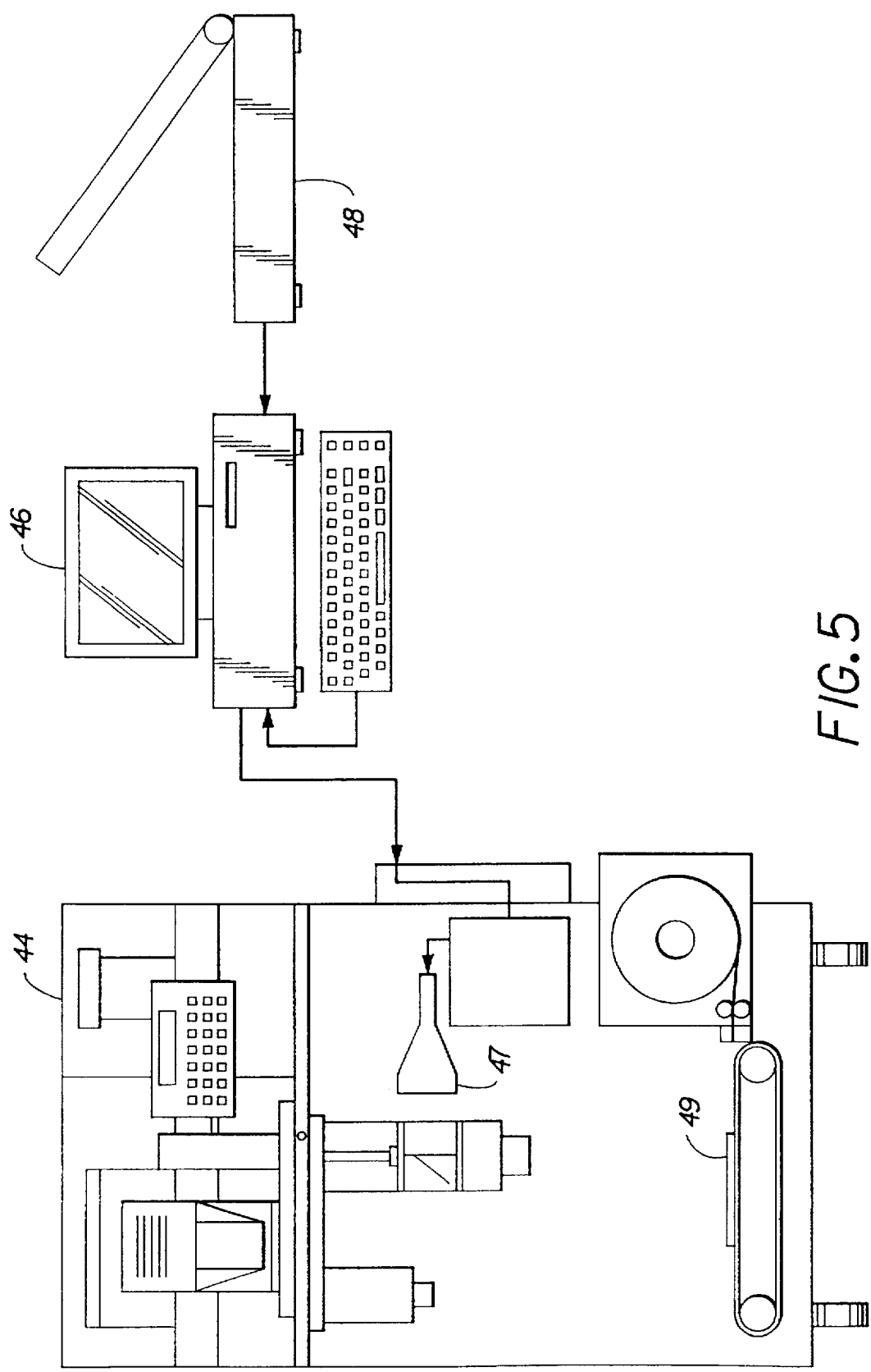
Figure 6:
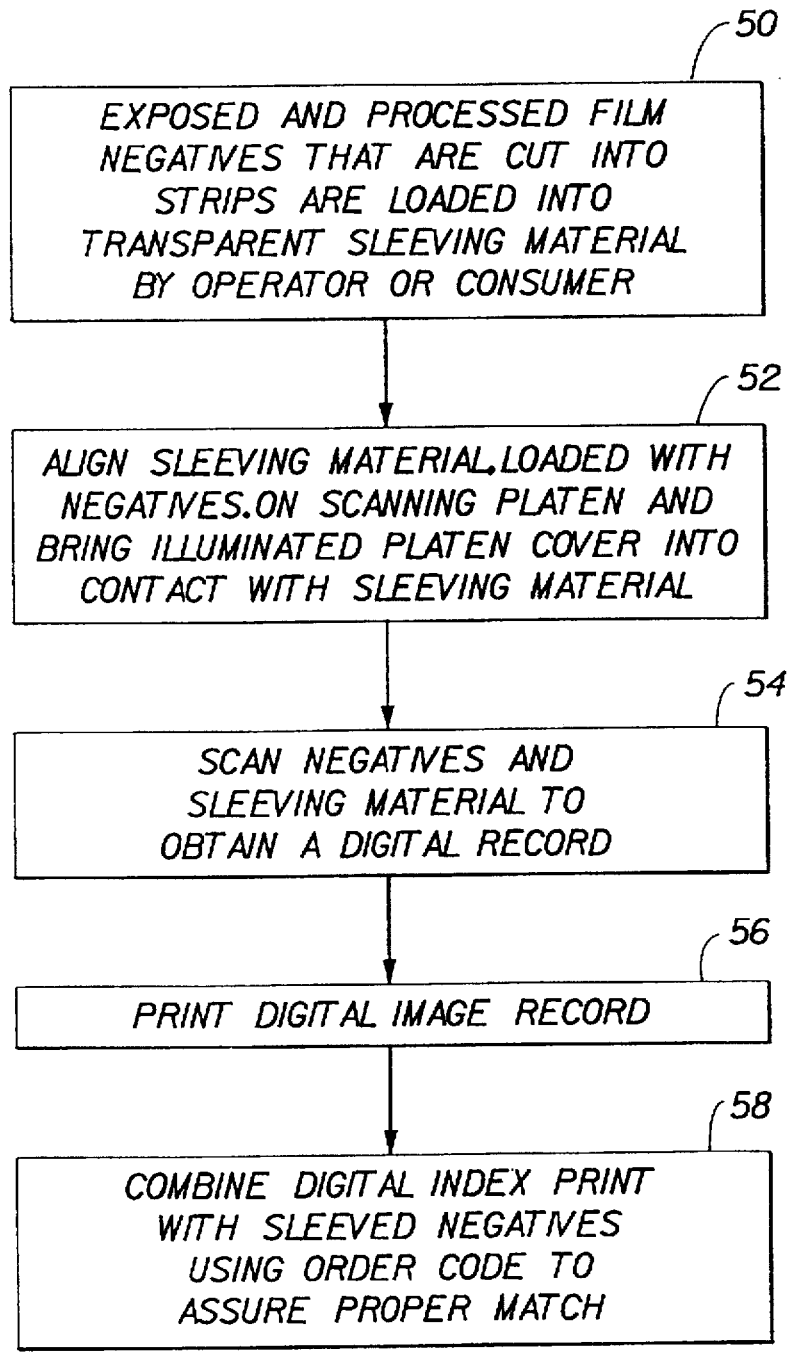
Figure 7:
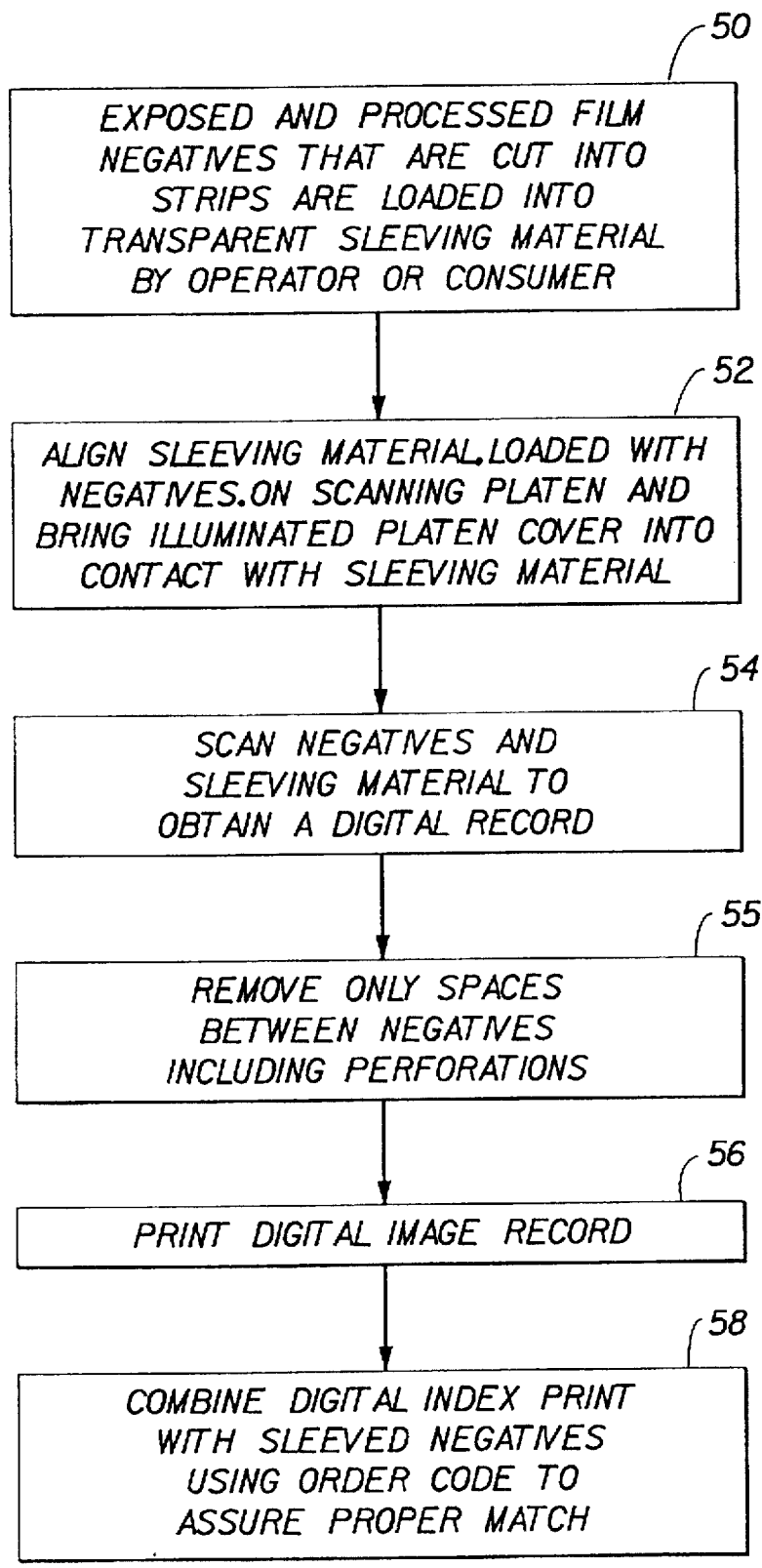
Figure 8:
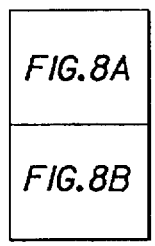
Figure 8A:
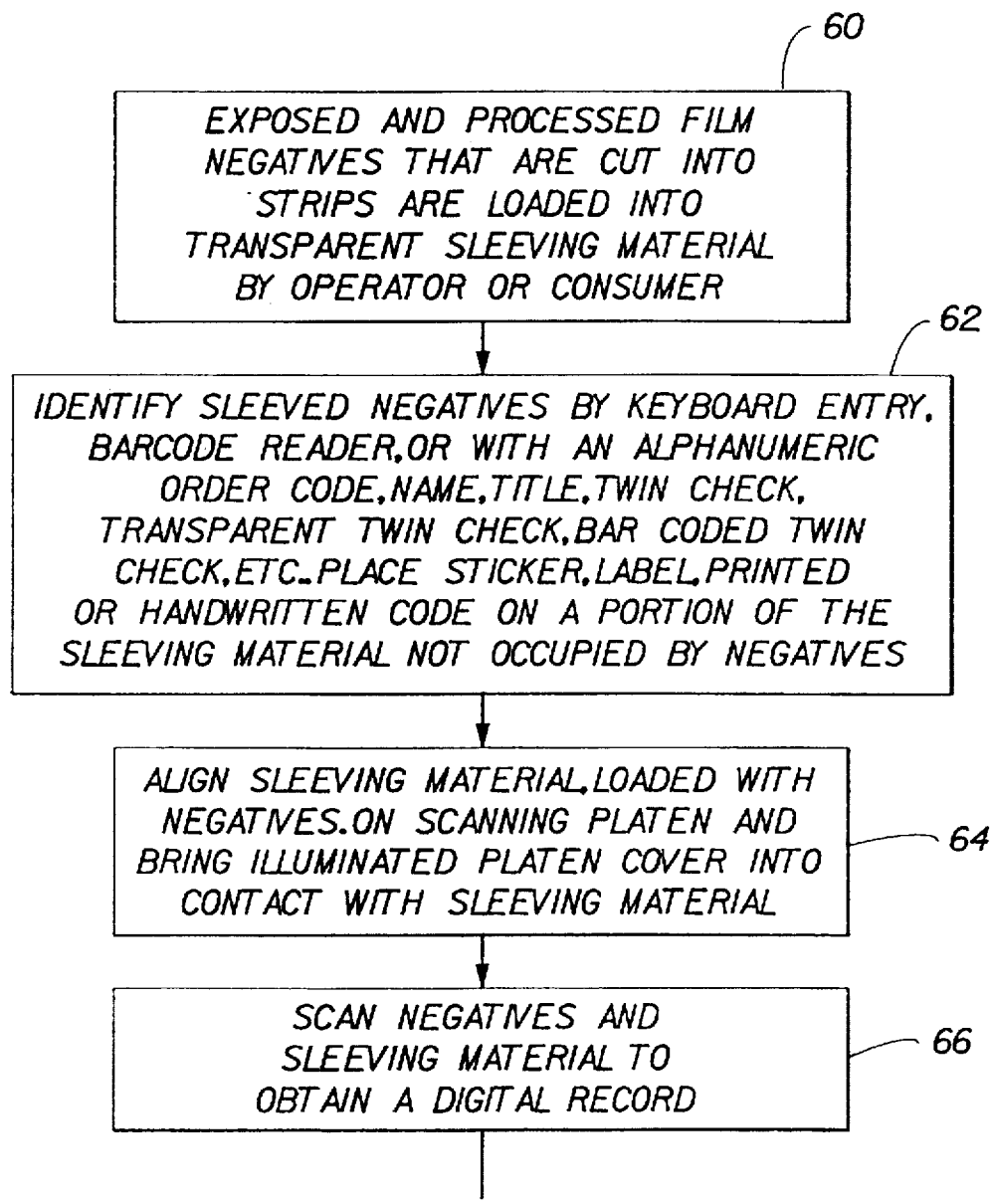
Figure 8B:
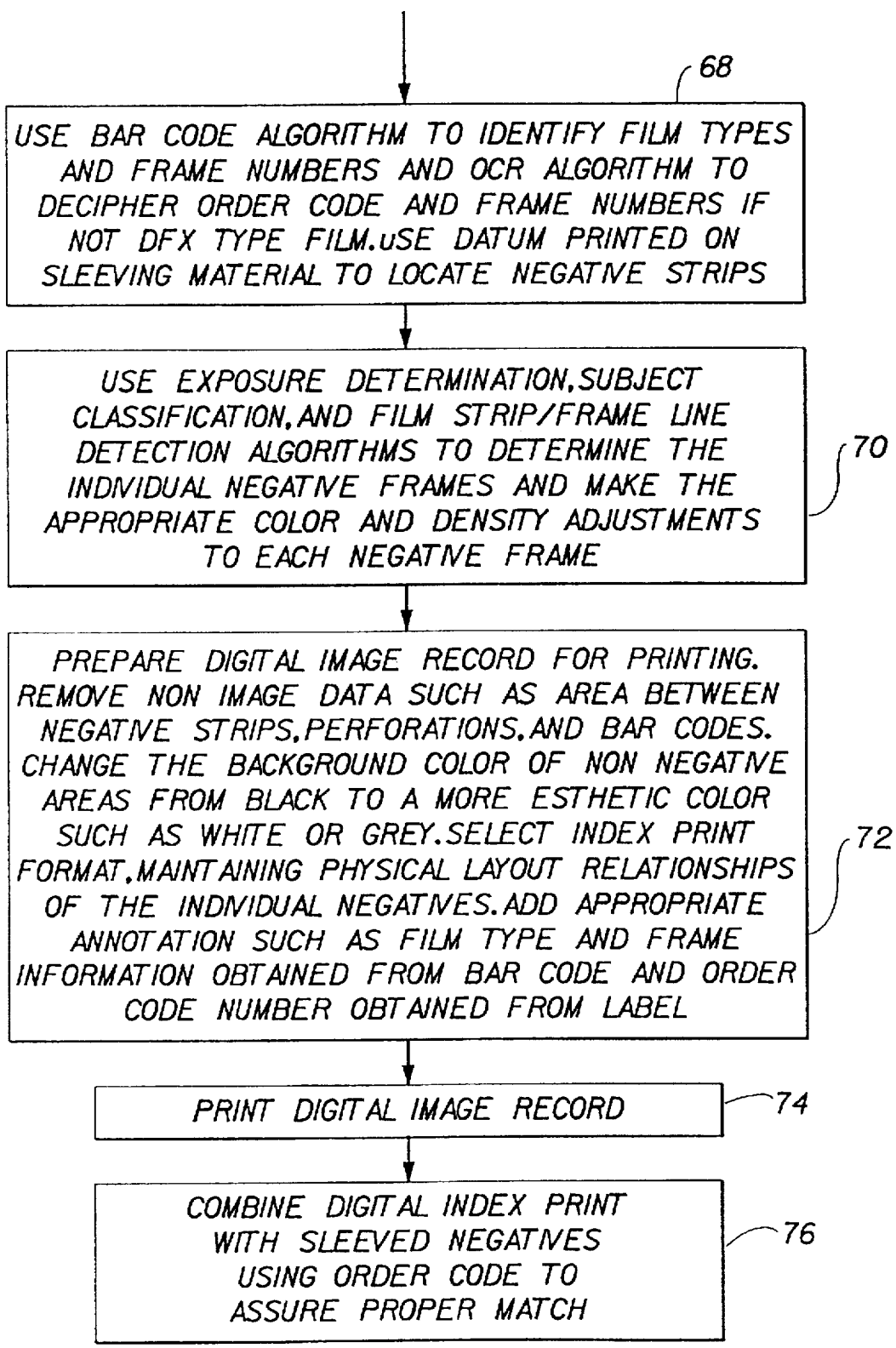
Figure 9A:
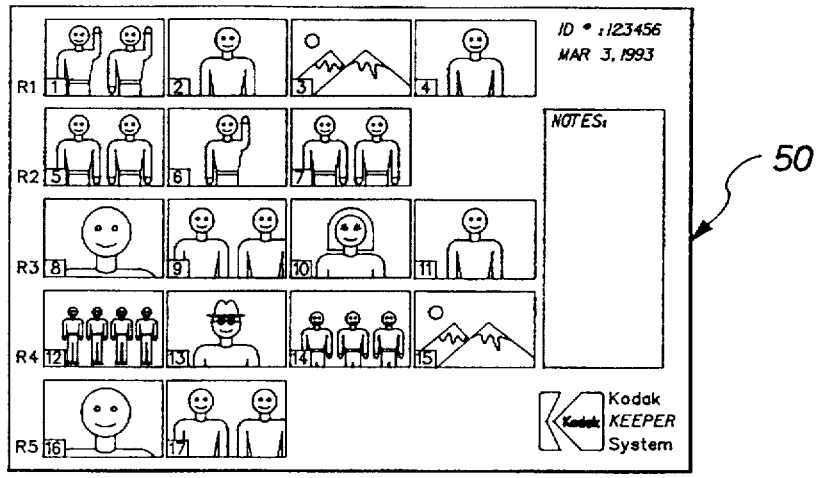
Figure 9B:
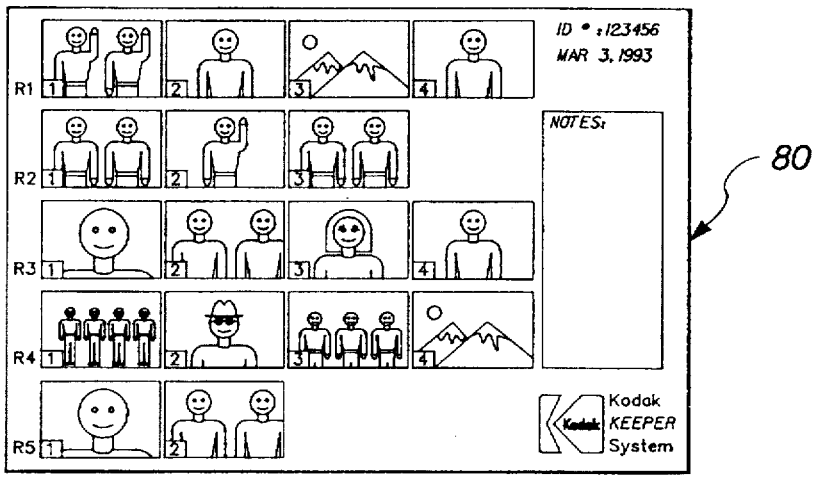
Figure 9C:
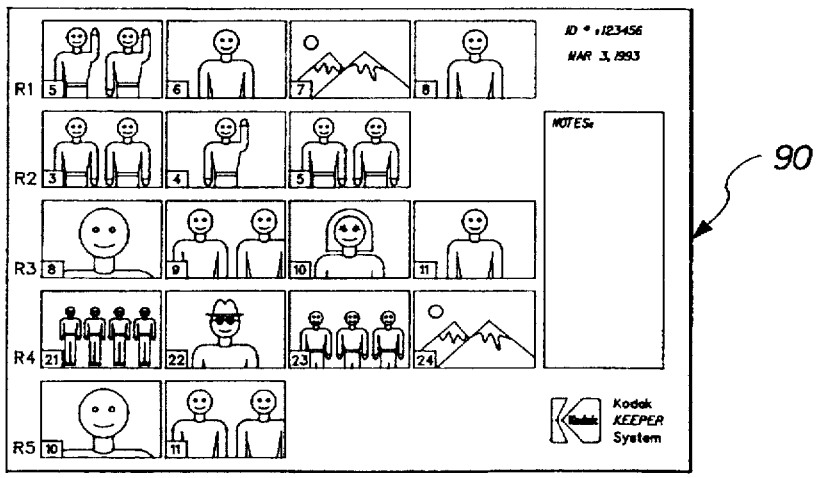

FIG. 4 is a schematic view of a photographic system used to make the index prints in accordance with the present invention;

FIG. 5 is a internal schematic view of the CRT printer illustrated in FIG. 3;

FIG. 6 is a full diagram of the method of producing the index print in accordance with the present invention;

FIG. 7 is a full diagram of an alternate method of making index prints in accordance with the present invention;

FIG. 8 illustrates a full diagram of yet another method for making index prints in accordance with the present invention;

FIGS. 9a, 9b, 9c are index prints made from the filmstrips in holder 24 as set forth in various formats.

Figure 10:
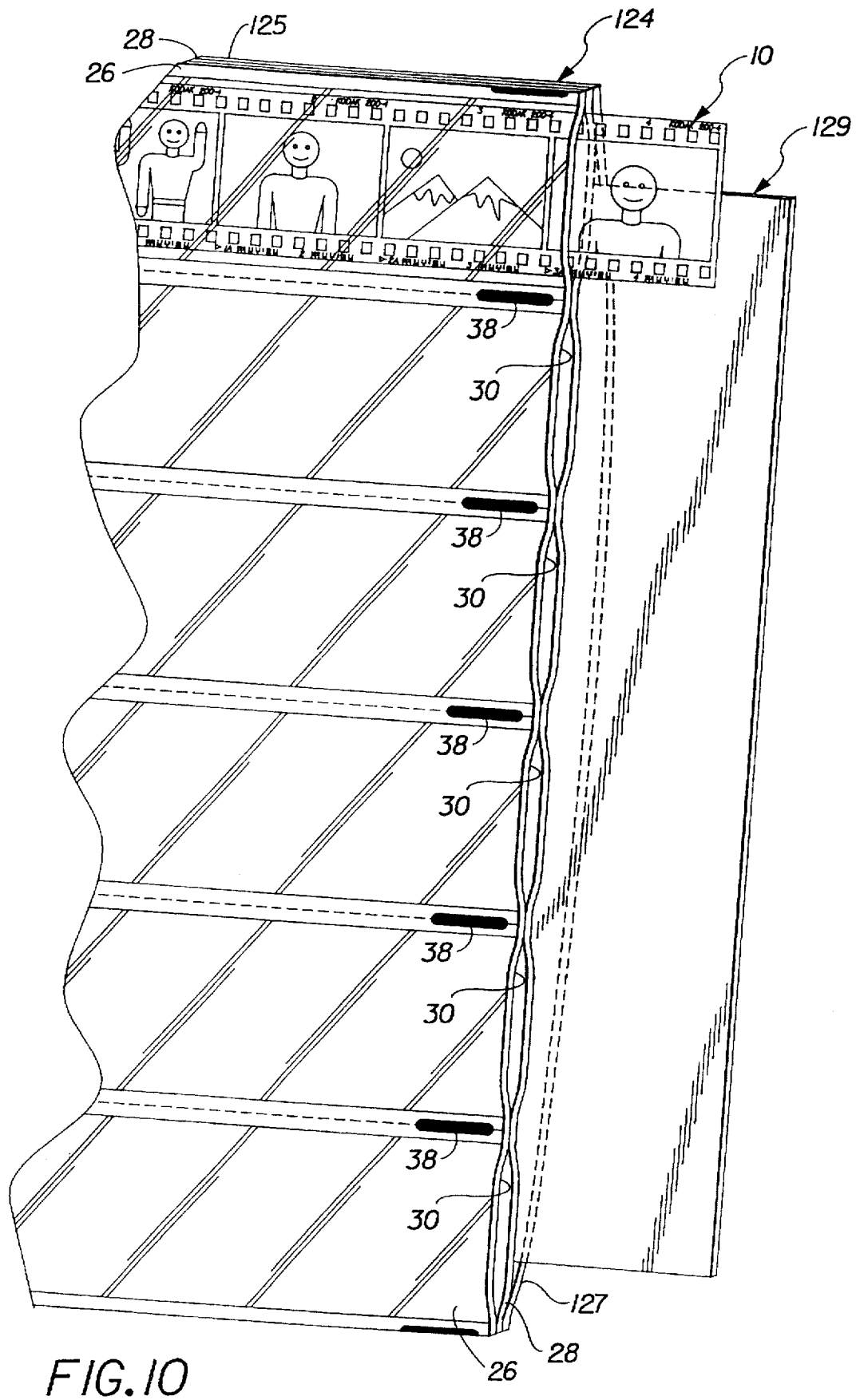

FIG. 10 is a perspective view of a modified holder made in accordance with the present invention.

DETAILED DESCRIPTION OF THE INVENTION

Figure 1:
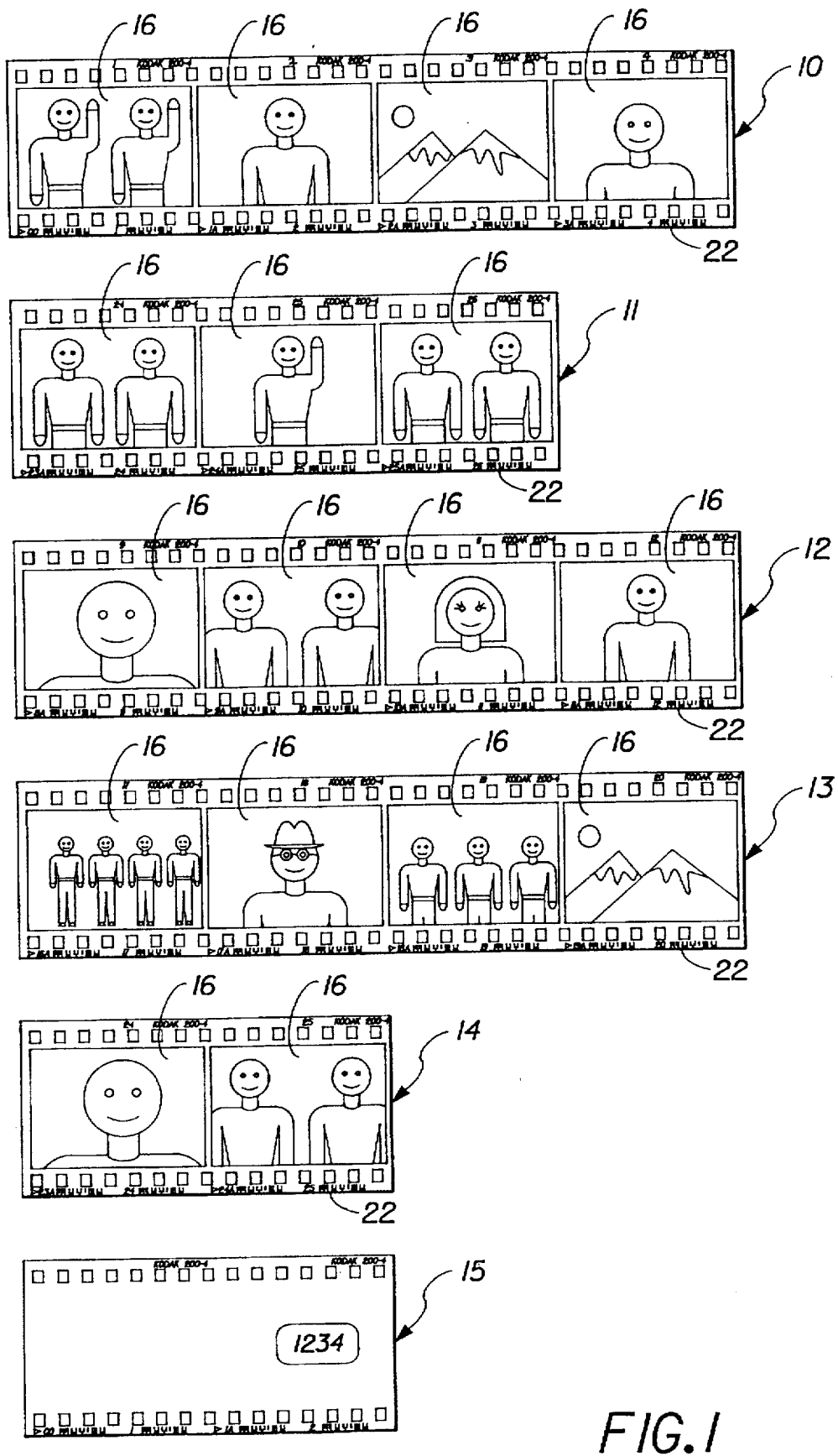
FIG. 1 is a graphic depiction of an assortment of photographic negative filmstrips.

FIG. 1 illustrates a plurality of negative filmstrips 10–15 which can result from a single roll or from portions of a plurality of rolls of film. The negative filmstrips 10, 11, 12, 13, 14 each have a plurality of film image areas 16. The negative filmstrip 15 contains no image area and instead has a twin check label 18 which is typically used to identify the roll of negative filmstrips. As is typical with negative filmstrips, various information can be provided along the edges of the filmstrip. For example, DX barcode, which is representative of the film type (the manufacturer and film sensitivity), are printed in the form of a latent image on the side portion of a negative filmstrip. In the embodiment illustrated, filmstrip 10 bears the latent image "Kodak 200-4" which identifies the film as manufactured by the Eastman Kodak Company and having an ASA of 200. In addition, filmstrip 10 bears latent images of frame number barcodes 22 which are used to identify desired frame identification such that when additional prints are provided, the film image areas can be quickly identified.

Figure 2:
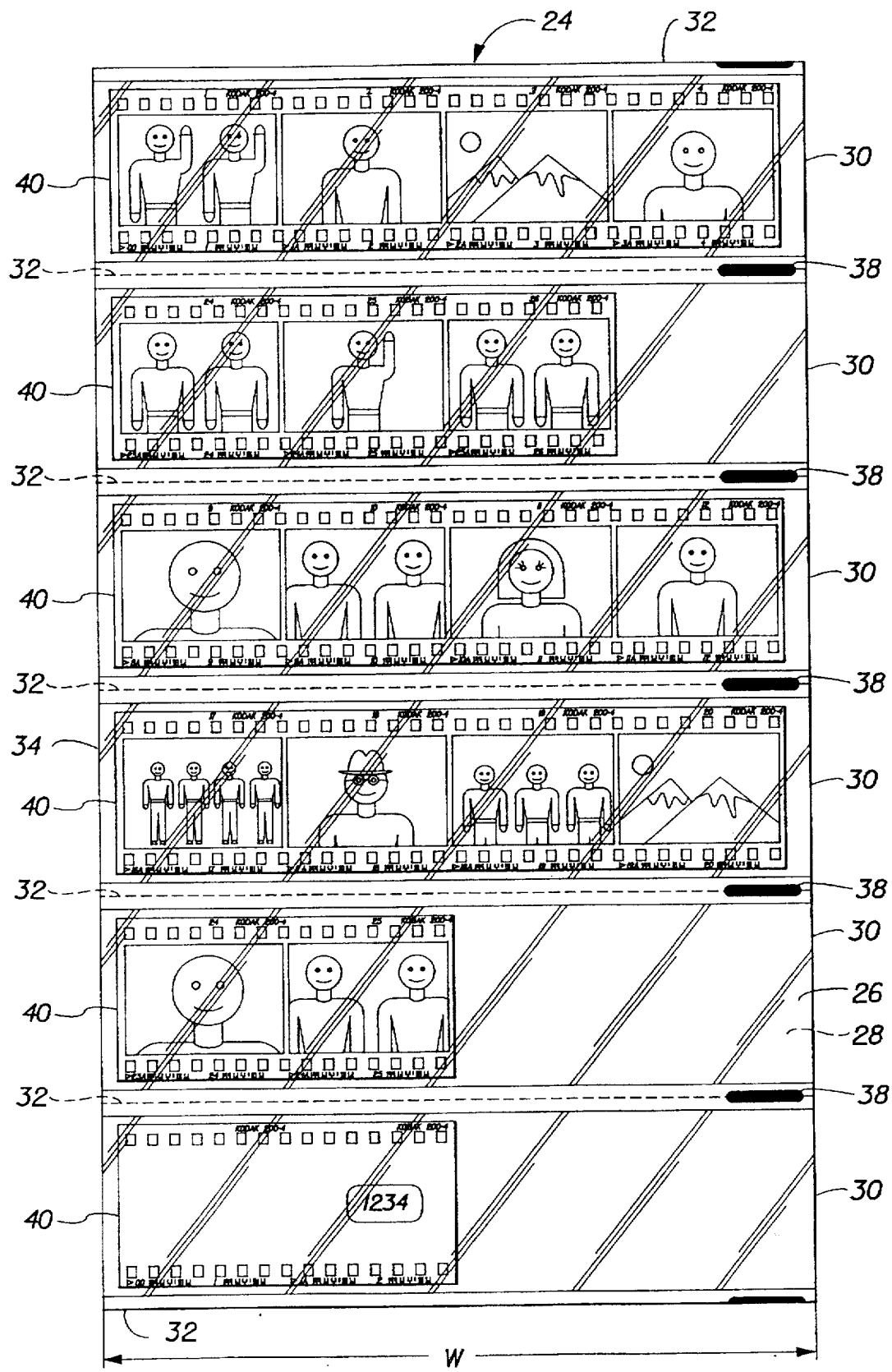
FIG. 2 is a graphic depiction of the photographic negative filmstrips of FIG. 1 placed into a holder made in accordance with the present invention.

FIGS. 2 and 3 illustrate a holder 24 made in accordance with the present invention. In particular, the holder comprises a pair of laminate sheets 26, 28 which are secured together so as to form a plurality of sleeves/pockets 30, each sleeve 30 is designed to hold a negative filmstrip. In the particular embodiment illustrated, the holder 24 is provided with six sleeves 30. However, it is to be understood that any desired number of sleeves 30 may be provided. In addition, the width W of the holder is selected so as to accommodate any appropriate size filmstrip. In the embodiment illustrated, the sheets 26, 28 are secured together at lines of contact 32, by standard heat sealing techniques, which define the height of the sleeves 30. The sheets 26, 28 are also preferably secured continuously, also by heat sealing, along edge 34. While in the preferred embodiment illustrated the sheets 26, 28 are secured together by heat sealing techniques, the sheets may be secured together by any desired method, for example, by adhesive or other mechanical securing means such as sewing. Sleeves 30 are each provided with an opening 36 which allows the filmstrips to be mechanically or manually inserted or removed from the sleeves 30.

The holder 24 is also provided with datum 38 which can be used to identify the orientation of the filmstrips 10–15 placed in sleeves 30. The datum 38 is simply a mark of any color, configuration or pattern that can be recognized by the scanner. In the embodiment illustrated each datum 38 is generally oval in shape and black in coloration. In particular, the datum 38 can be used such that when the negative filmstrips are inserted and the datum 38 are in a predetermined position, the film image areas will be properly oriented for scanning, as opposed to a backward position. Additionally, datum 38 can be used as a reference to assist in editing unwanted information that has been scanned as described further below. In the embodiment illustrated, the datum 38 will be on the right-hand side of the holder when the film image areas are properly positioned. The seal 33 along edge 34 allows positioning of each of the negative filmstrips 10–14 such that the left edge 40 are all substantially aligned with each other.

The holder 24 is made of a material that allows exposure of the negative filmstrips while within the holder 24. Preferably, the holder 24 is made of a transparent material which will not interfere the exposure of the images thereon. Typically the holder is made of a clear polyethylene. However, in certain situations it may be desirable to provide a tint or coloration to the print to be developed in which case the holder 24 may be provided in a different color.

FIGS. 4 and 5 illustrate a system which can be used to make index prints utilizing the holder 24 illustrated in FIGS. 1 and 2 containing negative filmstrips therein. In particular, this system includes a printer 44 which can print an index print from a digital record. In the particular embodiment illustrated, the printer 44 is a CRT printer. There is also provided a CPU/computer 46 which is used to allow entry of data and control the printer 44. The CRT printer is provided with a cathode ray tube 47 which projects an image onto a photosensitive material 49, for example, photosensitive paper which is then processed for development. It is, of course, understood that any other desired printer or other output format/device may be utilized for printing/storing of the digital record, including, for example, but not by way of limitation, thermal printers, LED printers, electrophotographic printers, or other digital-type printers.

The system further includes a digital scanner 48 for scanning an image placed in the scanner and converting the information to a digital signal. An appropriate digital scanner that can be utilized is exemplified by the Hewlett Packard ScanJet IICX color scanner with optional transparency adapter.

FIG. 6 illustrates a flow diagram of one method of producing index prints in accordance with the present invention. In particular, the first step 50 is that the cut negative filmstrips are loaded into the holder 24. The next step 52 is to place the holder 24, with the exposed processed negatives therein, onto the platen of the digital scanner 48 Preferably, the holder 24 is placed in a predetermined position so that the index print images fully utilize the area available on the index print. Once this has been done, the next step 54 is to scan the negative filmstrips while in the holder 24 so as to obtain a digital record. As can be seen, the entire area of the holder 24 is scanned in a single step to obtain the digital record. The next step 56 is to transfer this digital record to the printer by the appropriate software previously provided in the computer 46 such that a print image can be made by the printer 44. A suitable software package is sold by the Eastman Kodak Company under the Kodak Composite Machine trademark. The next step 58 is to combine the printed index print with the holder from which the index print is made. For example, the index print can be put into a plastic sleeve/envelope (not shown) along with the holder 24 fan-folded therein, if necessary, so that the holder 24 can fit within an envelope with the index print An index print made in accordance with the method set forth in FIG. 6 would be the simplest and easiest to produce.

The present invention may be set up such that the index print can provide more detailed information. Additionally, if desired, the non-image areas between image areas and adjacent film negatives may be removed from the index print.

For example, FIG. 7 illustrates a flow chart similar to that illustrated in FIG. 6, except that an extra step 55 is provided before printing of the digitally produced index print. In particular, appropriate algorithms are provided in the CPU for removing spaces between negative filmstrips and the area defined by the perforations in the negative filmstrips. This can also be accomplished by the Kodak Composite Machine software previously described. By doing this, the index print produced will look more similar to a conventional index print.

Because of the computer 46, various other manipulative steps may be provided for enhancing the index print and providing further additional data. FIG. 8 illustrates yet another method for producing index prints made in accordance with the present invention In particular, the first step 60 comprises placing the negative filmstrips into the holder 24. The second step 62 is to identify certain information provided in the filmstrips, e.g., the DX barcode, frame barcode, code twin check, or any other indicia that may be provided on the negative filmstrip in any optical recordable form. The Kodak Composite Machine software can also be used for this purpose. This identified information can be printed on a sticker/label which can be placed on the holder 24 or can be placed directly on the index print. Multiple index prints may be provided in the sleeve/envelope for a single holder. For example, when the holder 24 holds more film image areas than is typically printed on a single index print, a second index print can be provided with the envelope so that all of the print images can be reviewed in the holder. The next step 64 is to align the holder 24 onto the platen of the digital scanner 48. The next step 66 is to operate the scanner 48 so as to obtain a digital record of the film image areas. Then in step 68, the film type and frame numbers are identified. This information is stored for use in later printing this information onto the index print. The next step 70 is to determine the individual image areas on the negative filmstrips such that any spaces or areas therebetween can be edited out of the digital record. Additionally, appropriate measurements can be made regarding the color and density of the image areas so as to enhance the print images as they are printed out. Then in step 72, a digital image record is prepared, wherein all the non-image data corresponding to non-image areas between negative strips, perforations barcodes, etc. are removed from the digital record. In addition, the digital record can be modified to provide the desired color background to the areas around the print image areas, such as making the background white, gray, or black, to select an appropriate layout format in accordance with the physical layout of the negative filmstrips in the holder 24 and to provide the appropriate information regarding film type, frame, previously obtained from the DX barcodes. The next step 74 is to provide the digital image record to the printer 44 for printing the index print. The last step 76 is to combine the index print with the holder 24.

FIG. 9a illustrates an index print 50 made of the film image areas of the filmstrips located in the sleeves of the holder 24. In this particular format, the index print 50 is provided with row identification numbers R1 and R2, R3, R4 and R5 for identifying each of the rows of the filmstrips provided in sleeves of the holder 24. Associated with each of the print images are sequential numbers related to the film image areas In the particular embodiment illustrated, there are seventeen images that are sequentially numbered 1–17. In the particular embodiment illustrated, the right hand portion of the index print 50 is provided with other data, including, for example, the date in which the index print was made, an identification number, and a section for providing the informational text requested by the customer or added by the processor. For example, if the individual film strips are taken from various different rolls of film, notations as to which rolls or subject matter they relate to can be printed in the right hand portion on the index print. Additionally, appropriate trademarks and logos may be provided on the index print by the photofinishers for advertising their goods and services.

FIG. 9b illustrates an index print 80 of the negative filmstrips of FIG. 1. Index print 80 is similar to index print 50 except that the individual print images are numbered for each row R1–R5. For example, because the first row RI has only four print images and the second row R2 has only three print images, they are sequentially numbered 1–4 and 1–3, respectively. The print images in rows R3, R4 and R5 are numbered in the same manner.

FIG. 9c illustrates an index print 90 that is similar to the index prints 50 and 80 except in this particular embodiment the numbers adjacent to each print image are derived from the sequential film image area numbers obtained from the DFX code or OCR code of the alphanumeric frame number written on the filmstrips. This information can be particularly useful to identify the sources of individual filmstrips that have been taken from various different rolls of film and inserted into sleeves of the holder.

While Applicants have described three different index print formats, it is to be understood that any desired format may be used as is selected by the user and/or processor.

FIG. 10 illustrates a modified holder 124 made in accordance with the present invention. The holder 124 is similar to holder 24, like numerals indicating like parts. An additional sheet 125 is secured to either sheet 26 or 28 at its lateral edges so as to form a retaining pocket 127 designed to receive and hold an index print 129. The sheet 125 is preferably sized so that the retaining pocket 127 will be slightly larger than the index print. The sheet 125 is made of a material that does not interfere with the scanning of the negative filmstrip. Preferably sheet 125 is also made of a clear plastic such as polyethylene. Thus, it can be easily seen that the print images on the index print 129 placed in pocket 127 are in the same relative locations as the film image areas on the negative filmstrips in the sleeves of holder 24. This, of course, makes locating the appropriate film image areas very quick. Additional information can be provided on the index print which may be helpful in reprinting the negative filmstrips.

While specific reference has been made to the use of negative filmstrips, the present invention is equally applicable for use with positive film, slides, slide strips, color imaging, and black and white imaging.

It is to be understood that various changes and modifications may be made without departing from the scope of the present invention, the present invention being limited by the following claims.

We claim:

1. A method of printing an index print from at least one filmstrip disposed in a transparent holder having a plurality of sleeves, each of said plurality of sleeves capable of receiving a filmstrip, comprising the steps of:

providing said holder having a plurality of sleeves for holding a like plurality of filmstrips each having at least one film image area;

inserting at least one filmstrip having at least one film image area into at least one sleeve of said holder;

placing said holder on a platen of a digital scanner and scanning said holder including the film image areas present on said at least one filmstrip so as to obtain a digital record comprising image data corresponding to the film image area or areas and non-image data between the film image area or areas;

identifying the image data within said digital record corresponding to film image area or areas on said at least one filmstrip;

preparing a digital image record for printing by removing said non-image data from said digital record and arranging said image data for printing a print image or print images on said index print in a predetermined format; and printing an index print having a print image or print images thereon in said predetermined format from said digital image record.

2. The method according to claim 1 wherein said image data in said digital record is stored in memory.

3. The method according to claim 2 said image data comprises the color and density of said film image areas.

4. The method according to claim 1 wherein said holder is made of a transparent material.

5. The method according to claim 4 wherein said holder is made of a substantially clear polyethylene material.

6. The method according to claim 1 wherein said image data is used to control printing of said digital image record.

7. The method according to claim 1 further comprising the steps of:

storing said digital record; and transmitting said digital record to a another device for printing or storage.

8. The method according to claim 1 wherein said film consists of one of the following: negative filmstrip, positive filmstrip, positive slide, negative slide.

9. The method of claim 1 further comprising the step of:

identifying any filmstrip information recorded on said filmstrips; and wherein said preparing step further comprises:

employing said filmstrip information in preparing said digital image record in accordance with said format.

10. The method of claim 1 further comprising the step of:

identifying any filmstrip image area numbers recorded on said filmstrips; and wherein said preparing step further comprises:

employing said filmstrip image area numbers in preparing said digital image record in accordance with said format.

11. The method of claim 1 further comprising the step of:

identifying any filmstrip image area numbers recorded on said filmstrips; and wherein said preparing step further comprises:

employing said filmstrip image area numbers in preparing said digital image record in said format having numbers printed on said index print in relation to said print images.

12. The method of claim 1 further comprising the step of printing image numbers in association with each print image area on said index print.

13. A method of making an index print comprising a plurality of individual print images from a like plurality of film image areas of film arranged in a film holder and scanned by a digital scanner to derive a digital record thereof comprising the steps of:

providing said film holder for holding film having a plurality of film image areas in a corresponding plurality of locations of said film holder, said film holder made of a first material that allows digital scanning of said film image areas and having datum thereon associated spatially with respect to said plurality of locations, said datum formed of a second material that is distinguishable from said first material when scanned into said digital record for identifying said plurality of locations within said digital record;

positioning at least one film image area in a location of said holder;

positioning said holder on a platen of a digital scanner with said datum oriented in a predetermined orientation with said platen;

digitally scanning said film holder to develop said digital record comprising image data corresponding to each scanned film image area and non-image data corresponding to the remaining space of said holder including non-image data corresponding to scanned datum;

formatting said digital record as a digital image record by employing said non-image data corresponding to each scanned datum as a reference for locating said image data; and reproducing an index print from said digital image record containing at least one print image of said at least one film image area.

14. The method of claim 13 further comprising the step of:

identifying any film information recorded on said film; and wherein said formatting step further comprises:

employing said film information in formatting said digital image record.

15. The method of claim 13 wherein the formatting step further comprises the steps of:

identifying non-image data between adjacent image data corresponding to adjacent scanned film image areas in relation to each said reference; and removing said non-image data from said digital record in formatting said digital image record.

16. The method of claim 13, following the scanning step, further comprising the steps of:

determining the orientation of said holder on said platen from said reference as the predetermined orientation or as an incorrect orientation differing from said predetermined orientation;

in the event that said holder is determined to be in said predetermined orientation, proceeding with the formatting and reproducing steps; and in the event that an incorrect orientation is determined, alerting the user to orient said holder to said predetermined orientation.

17. The method of claim 13 further comprising the step of:

identifying any film image area numbers recorded on said film; and wherein said formatting step further comprises:

employing said film image area numbers in formatting said digital image record to reproduce said print images with print image numbers.

18. The method of claim 13 wherein:

said film is in the form of at least one filmstrip having at least one film image area thereon; and said holder is formed with a plurality of elongated sleeves to hold a like plurality of filmstrips in side by side relation to provide said locations for said film image areas to facilitate digital scanning of the at least one filmstrip through said first material to obtain said digital record, each sleeve being configured so as to receive a filmstrip separated from a filmstrip in adjacent sleeves by an elongated separation space, and a plurality of said datum are spatially associated with said plurality of sleeves thereby providing said references to the locations of said sleeves and filmstrips located therein when said holder holding at least one filmstrip is digitally scanned.

19. The method of claim 18, following the scanning step, further comprising the steps of:

determining the orientation of said holder on said platen from said references as the predetermined orientation or as an incorrect orientation differing from said predetermined orientation;

in the event that said holder is determined to be in said predetermined orientation, proceeding with the formatting and reproducing steps; and in the event that an incorrect orientation is determined, alerting the user to orient said holder to said predetermined orientation.

20. The method of claim 18 wherein the formatting step further comprises the steps of:

identifying non-image data between adjacent image data corresponding to adjacent scanned film image areas in relation to each said reference; and removing said non-image data from said digital record in formatting said digital image record.

21. The method of claim 18 further comprising the step of:

identifying any filmstrip information recorded on said filmstrips; and wherein said formatting step further comprises:

employing said filmstrip information in formatting said digital image record.

22. The method of claim 18 further comprising the step of:

identifying any filmstrip image area numbers recorded on said filmstrips; and wherein said formatting step further comprises:

employing said filmstrip image area numbers in formatting said digital image record to reproduce said print images with print image numbers.

* * * * *